United States Patent [19]

Meisert et al.

[11] 4,035,529

[45] July 12, 1977

[54] COATING THE BACK OF A TEXTILE FLOOR COVERING WITH A POLYURETHANE FOAM

[75] Inventors: Ernst Meisert, Leverkusen; Klaus Recker, Cologne; Gerhard Grögler, Leverkusen; Cornelius Mühlhausen, Gladenbach; Gerd Reinecke, Schildgen, all of Germany

[73] Assignee: Bayer Aktiengesellschaft, Leverkusen, Germany

[21] Appl. No.: 602,943

[22] Filed: Aug. 7, 1975

[30] Foreign Application Priority Data

Aug. 22, 1974 Germany .................... 2440271

[51] Int. Cl.² ............... B05D 5/00; B05D 3/02
[52] U.S. Cl. .................. 427/244; 427/333; 427/373; 428/315; 156/78
[58] Field of Search ............ 427/244, 333, 373; 428/315; 156/78

[56] References Cited

U.S. PATENT DOCUMENTS

| | | | |
|---|---|---|---|
| 3,228,820 | 1/1966 | Samson | 428/315 X |
| 3,328,225 | 6/1967 | Urbanic et al. | 428/315 X |
| 3,577,257 | 5/1971 | Hutzler et al. | 427/333 X |
| 3,748,217 | 7/1973 | May et al. | 156/78 X |
| 3,931,429 | 1/1976 | Austin | 427/373 X |

Primary Examiner—Ronald H. Smith
Assistant Examiner—Evan K. Lawrence
Attorney, Agent, or Firm—Gene Harsh; Joseph C. Gil

[57] ABSTRACT

The instant invention relates to a process for coating the back of textile floor coverings, e.g. carpets, with polyurethane foams wherein it is possible to obtain particularly firm fixing of the nap and improved anchorage of the textile filaments. The process broadly comprises:
a. applying to the back of a textile floor covering a first coat consisting essentially of a reacting foamable mixture of a polyol and a large excess of polyisocyanate,
b. before said first coat has been hardened, applying thereto reacting foamable mixture of substantially equivalent quantities of polyol and polyisocyanate, and
c. thereafter hardening the resultant product.

4 Claims, 1 Drawing Figure

COATING THE BACK OF A TEXTILE FLOOR COVERING WITH A POLYURETHANE FOAM

BACKGROUND OF THE INVENTION

It is generally known that textile floor coverings can be provided with a firmly adhering backing layer of polyurethane foams by applying a reactive liquid mixture of polyurethane-forming components to the back of the textile (see, e.g. German Offenlegungsschriften Nos. 2,208,995; 1,926,285 and 2,262,742). In the one prior art process, a reactive liquid foamable mixture of polyisocyanates and polyols is applied to the back of a textile floor covering to form a thin coating of a flexible polyurethane foam which, before hardening, has a second layer of a preformed flexible polyurethane foam applied to it (see, e.g. German Offenlegungsschrift No. 2,262,742).

Unfortunately, many conventional processes are attended by significant disadvantages in addition to which the products obtained therefrom are of inadequate quality. In particular, the fixing of the nap and filaments of the textile floor covering is generally inadequate when foamed coatings are applied. In addition, the product is generally not "stiff" enough for the consumer.

To offset these disadvantages, the prior art has attempted to initially preconsolidate the textile substrate with a first coat which itself has high strength and, upon completion of preconsolidation, to apply the reactive foamable layer in a second operation. The art has also attempted to join a preformed foam layer to the textile floor covering by a thick coat of adhesive which is also intended to fix the nap. Unfortunately, this is both complicated and expensive because different starting components have to be used and because additional process steps are involved. In fact, because of its foam structure, the layer of adhesive is of only limited strength, with the result that, in many cases, the anchorage of the textile filaments is as inadequate as when the foamed covering is directly produced on the back of the textile.

SUMMARY OF THE INVENTION

It has now surprisingly been found that it is readily possible, using starting components generally known for use as polyurethane backings for textile floor coverings, to obtain improved fixing of the textile filaments, increased stiffness of the carpet without adverse effect upon the flexibility of the backing by applying to a textile floor covering a first coat consisting essentially of a reacting mixture of a polyol and a large excess of polyisocyanate; thereafter applying, before the first coat has hardened, a foamable main coat of substantially equivalent quantities of polyol and polyisocyanates; and, then hardening the material in a heating zone. Accordingly, the present invention relates to a process for coating the backs of textile floor coverings with foamable (and, if desired, prefoamed) reacting mixtures of one or more polyols one or more difunctional or higher-functional organic isocyanates and, optionally fillers, blowing agents, activators, stabilizers and pigments, distinguished by the fact that, in a first step, a reacting foamable mixture of polyols and polyisocyanates is directly applied as a first coat to the back of the substrate to be coated, the NCO:OH equivalent ratio in the reacting foamable mixture being from 1.5:1 to 3.5:1 and preferably from 2.0:1 to 3.0:1 and in a second step, a second foamable (and if desired, prefoamed) reacting layer of polyols and polyisocyanates is applied as a main coat either directly or by reverse coating to the first coat preferably before the first coat has fully reacted, i.e. while the first coat still contains free NCO groups and has undergone little or no foaming. The NCO:OH ratio in the second foamable layer is maintained from 0.95:1 to 1.25:1 and preferably from 1.05:1 to 1.15:1. The composite material is then left to harden.

Figure 1:
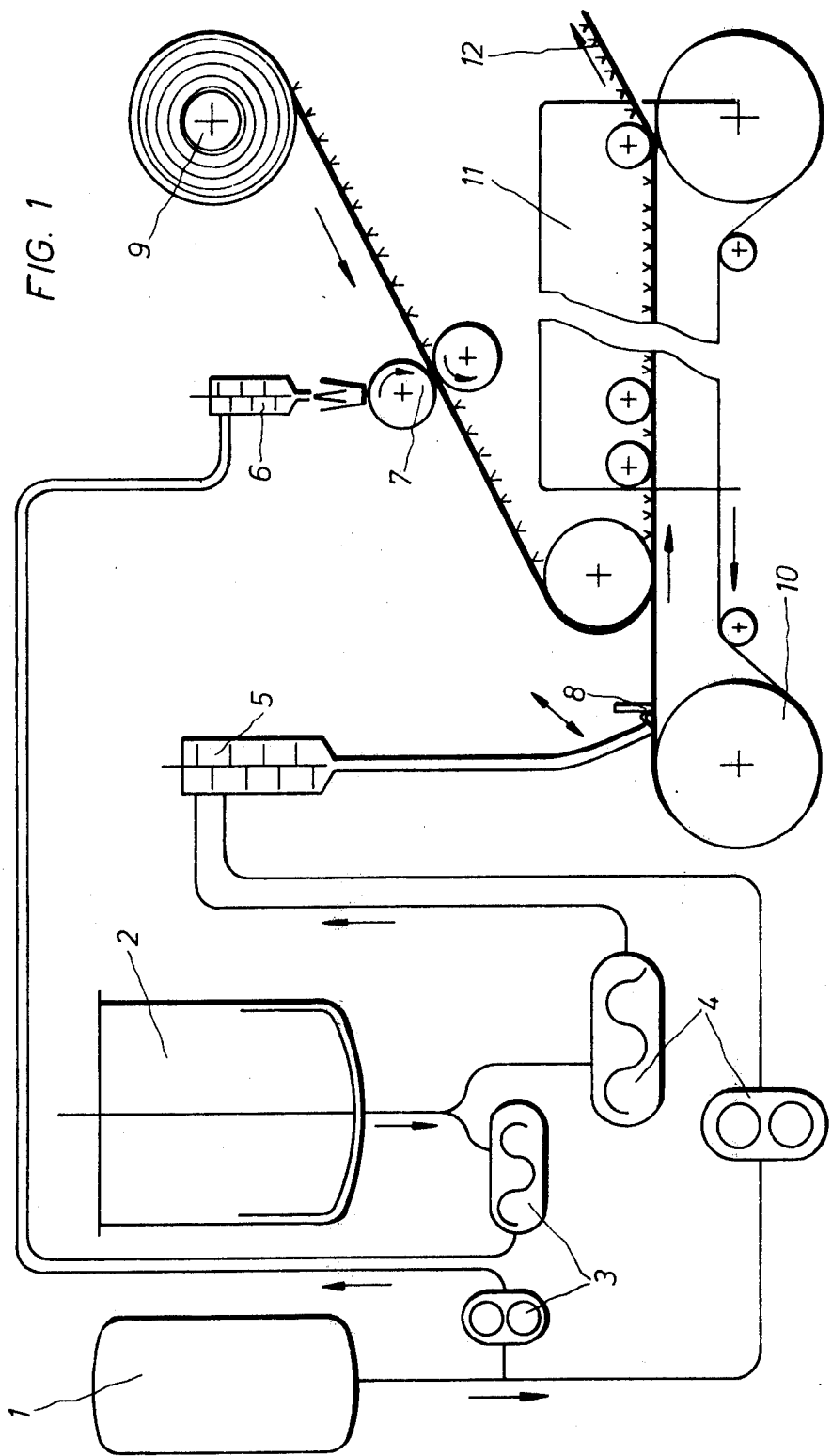
FIG. 1 schematically shows an apparatus which may be used for carrying out the process according to the invention.

1. represents a storage tank containing the polyisocyanate,
2. a storage tank for the mixture of polyol and filler;
3. is a metering equipment for the first coat, 4. a metering equipment for the main coat; 5. and 6. represent mixing heads for the main coat and the first coat, respectively; 7. is a roll coater for the first coat, 8. a doctor blade for the main coat; 9. is the carpet to be coated; 10. represents a conveyor equipment for the release substrate; 11. represents the drying chamber; 12. is the coated carpet.

DESCRIPTION OF THE PREFERRED EMBODIMENTS

The process according to the invention is preferably carried out utilizing the same polyol component, which may optionally contain fillers, activators, stabilizers and pigments, and the same organic isocyanate for both the main coat and the first coat. In this way, nap fixing, stiffness, and filament anchorage are considerably improved in a very simple, economic manner, using the same starting materials and compounds without any adverse effect either upon the softness or the resilience of the first product.

The polyol components used for the first coat and main coat are known and are preferably polyethers having molecular weights of from 400 to 4000. They can be used in admixture with low molecular weight polyols and with the addition of activators and blowing agents. Mineral fillers, foam stabilizers, antiagers and similar additives of the kind normally used in polyurethane chemistry may also be added to the polyols. The polyethers suitable for use include those obtained by polymerizing tetrahydrofuran or epoxides such as ethylene oxide, propylene oxide, butylene oxide, styrene oxide or epichlorohydrin in the presence of a catalyst such as $BF_3$, or by adding these epoxides in admixture or in succession, to starter components containing reactive hydrogen atoms such as water, alcohols or amines. Suitable starter components include ethylene glycol, 1,3-propylene glycol, 1,2-propylene glycol, trimethylol propane, 4,4'-dihydroxy diphenyl propane, aniline, ammonia, ethanolamine, ethylene diamine and water. Sucrose polyethers of the type described in German Auslegeschrifts 1,176,358 and 1,064,938 may also be used in accordance with the invention. In many cases, it is preferred to use polyethers of the type generally known which contain substantial amounts of primary OH-groups (up to 90% by weight, based on all the OH-groups present in the polyether). Polyethers modified with vinyl polymers of the type formed by polymerizing styrene and acrylonitrile in the presence of polyethers (U.S. Pat. Nos. 3,383,351; 3,304,273;

3,523,093 and 3,110,695 and German Pat. No. 1,152,536) are also suitable as are polybutadienes containing OH-groups.

Polyols having a molecular weight below 400 may optionally be used in addition to the polyethers. Examples of such polyols include ethylene glycol, 1,2- and 1,3-propylene glycol, 1,4- and 2,3-butylene glycol, 1,6-hexanediol, 1,8-octane diol, neopentyl glycol, 1,4-bis-hydroxy methyl cyclohexane, 2-methyl-1,3- propane diol, glycerol, trimethylol propane, 1,2,6-hexane triol, 1,2,4-butane triol, trimethylol ethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, polybutylene glycols and the like.

Instead of using polyethers, it is also possible as is recognized in the polyurethane art to utilize polyesters, polythioethers, polyacetals, polycarbonates, polyester amides, or mixtures thereof, having molecular weights in the range from 400 to 10,000 and preferably from 1000 to 6000.

The polyesters containing hydroxyl groups suitable for use include the reaction products of polyhydric (preferably dihydric and optionally trihydric) alcohols with polyvalent (preferably divalent) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be substituted (e.g. with halogen atoms) and/or unsaturated. Examples of carboxylic acids of this kind include succinic acid; adipic acid; suberic acid; azelaic acid; sebacic acid; phthalic acid, isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Examples of suitable polyhydric alcohols include ethylene glycol, 1,2-propylene glycol, 1,3-propylene glycol; 1,4- and 2,3-butylene glycol; 1,6-hexane diol; 1,8-octane diol; neopentyl glycol; cyclohexane dimethanol (1,4-bis-hydroxy methyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyester of lactones such as ε-caprolactone, or hydroxy carboxylic acids such as ω-hydroxy caproic acid.

The polythioethers usable include the condensation products of thiodiglycol alone or thiodiglycol with other glycols, dicarboxylic acids, formaldehyde, amino carboxylic acids or amino alcohols. The products can be characterized as polythio mixed ethers, polythioether esters or polythioether ester amides, depending upon the co-components used.

Examples of suitable polyacetals include the compounds obtained from glycols, such as diethylene glycol, triethylene glycol, 4,4'-dioxethoxydiphenyl dimethyl methane, and hexane diol, and formaldehyde. Polyacetals suitable for use in accordance with the invention can also be obtained by polymerizing cyclic acetals.

Suitable polycarbonates containing hydroxyl groups are those of the type which are generally known and which may be obtained by reacting diols, such as 1,3-propane diol, 1,4-butane diol and/or 1,6-hexane diol, diethylene glycol, triethylene glycol or tetraethylene glycol, with diaryl carbonates (for example diphenyl carbonate) or phosgene.

The polyester amides and polyamides suitable for use herein include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified natural polyols, such as castor oil, carbohydrates or starch, may also be used. Addition products of alkylene oxides with phenol-formaldehyde resins or even with urea-formaldehyde resins may also be used in accordance with the invention.

Examples of the many and varied types of compounds suitable for use in accordance with the invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44 to 54, and Vol. II, 1964, pages 5 to 6 and 198 to 199, and also in Kunststoff-Handbuch, Vol. VII, Vieweg-Hochtlen, Carl-Hanser-Verlag, Munich, 1966, pages 45 to 71.

Essentially any organic polyisocyanate may be used herein. Thus, it is possible in accordance with the invention to utilize araliphatic, aromatic and heterocyclic polyisocyanates. Specific examples of useful isocyanates include, 1,3- and 1,4-phenylene diisocyanate; 2,4- and 2,6-tolylene diisocyanate and mixtures of these isomers, diphenyl methane-2,4'-and/or 4,4'-diisocyanate; naphthylene-1,5-diisocyanate; triphenyl methane-4,4',4''-triisocyanate; polyphenyl polymethylene polyisocyanates which may be obtained by condensing aniline with formaldehyde, followed by phosgenation and which are of the type described for example in British Pat. No. 874,430 and 848,671, perchlorinated aryl polyisocyanates of the type described in German Auslegeschrift 1,157,601; polyisocyanates containing carbodiimide groups, of the type described in German Pat. No. 1,092,007; the diisocyanates described in U.S. Pat. No. 3,492,330; polyisocyanates containing allophanate groups of the type described for example in British Pat. No. 994,890 Belgian Pat. No. 761,626 and published Dutch Pat. Application No. 7,102,524; polyisocyanates containing isocyanate groups of the type described, for example, in German Pat. Nos. 1,022,789; 1,222,067 and 1,027,394 and in German Offenlegungsschrifts Nos. 1,929,034 and 2,004,048; polyisocyanates containing urethane groups as described in U.S. Pat. No. 3,394,164; the polyisocyanates containing acylated urea groups described in German Pat. No. 1,230,778; polyisocyanates containing biuret groups of the type described, for example, in German Pat. No. 1,101,394, in British Pat. No.

889,050 and in French Pat. No. 7,017,514; polyisocyanates obtained by telomerization reactions as described in Belgian Pat. No. 723,640; polyisocyanates containing ester groups of the type described, for example, in British Pat. Nos. 956,474 and 1,072,956, in U.S. Pat. No. 3,567,763 and in German Pat. No. 1,232,688; and reaction products of the above-mentioned isocyanates with acetals as described in German Pat. No. 1,072,385.

It is also possible to use the distillation residues containing isocyanate groups which accumulate in the industrial-scale production of isocyanates, optionally in solution in one or more of the above-mentioned polyisocyanates. It is also possible to use mixtures of the aforementioned polyisocyanates.

In general, it is particularly preferred to use readily available polyisocyanates, such as 2,4- and 2,6-tolylene diisocyanate and mixtures of these isomers (TDI), polyphenyl-polymethylene polyisocyanates; of the type obtained by condensing aniline with formaldehyde, followed by phosgenation (crude MDI); and polyisocyanates containing carbodiimide groups, urethane groups, allophanate groups, isocyanurate groups, urea groups or biuret groups (so-called modified polyisocyanates).

Blowing agents suitable for use in accordance with the instant invention include water and/or readily volatile organic substances. Examples of organic blowing agents include acetone; ethyl acetate; methanol; ethanol; halogen-substituted alkanes such as methylene chloride, chloroform; ethylene chloride; vinylidene chloride; monofluorotrichloromethane; chlorodifluoromethane and dichlorodifluoromethane; butane; hexane; heptane; diethyl ethers and the like. A blowing effect can also be obtained by adding compounds of the type which decompose at temperatures above room temperature to give off gases (for example nitrogen). Examples of these compounds are the known azo compounds, such as azoisobutyronitrile. Further examples of blowing agents and information at to their use may be found in Kunststoff-Handbuch, Vol. VII, Vieweg and Hochtlen, Carl-Hanser-Verlag, Munich 1966, pages 108 and 109, 453 to 455 and 507 to 510.

Additionally, catalysts are often used in the process of the instant invention. Suitable catalysts include those of the type generally known. Examples include tertiary amines such as triethyl amine, tributyl amine, N-methyl morpholine, N-ethyl morpholine, N-cocomorpholine, N,N,N', N'-tetramethyl ethylene diamine, 1,4-diazabicyclo-(2,2,2)-octane, N-methyl-N'-dimethyl aminoethyl piperazine, N,N-dimethyl benzyl amine, bis-(N,N-diethyl aminoethyl)-adipate, N,N-diethyl benzyl amine, pentamethyl diethylene triamine, N,N-dimethyl cyclohexyl amine, N,N,N',N'-tetramethyl-1,3-butane diamine, N,N-dimethyl-β-phenyl ethyl amine, 1,2-dimethyl imidazole and 2-methyl imidazole.

Other suitable catalysts include metal chelates, bicyclic amidines and monocyclic amidines, either alone or especially in combination with monocarboxylic or dicarboxylic acids.

Suitable bicyclic amidines include compounds corresponding to the general formula

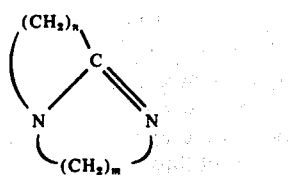

in which $m = 2$ or $3$ and $n = 3, 4$ or $5$.

Examples of monocyclic amidines include compounds corresponding to the general formula

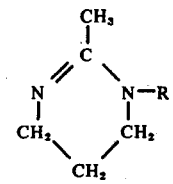

in which R is an optionally branched and/or heteroatom-containing aliphatic, cycloaliphatic, araliphatic or aromatic radical having 1 to 15 carbon atoms. R may thus be, for example, methyl, cyclohexyl, 2-ethyl hexyl, benzyl, cyclohexyl methyl, ethoxyl or a radical corresponding to the formula

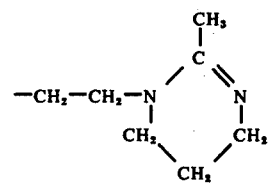

In addition, other catalysts may also be used in the process according to the invention. Examples of these catalysts and information about the manner in which they perform may be found in Kunststoff-Handbuch, Vol. VII, Vieweg and Hochtlen, Carl-Hanser-Verlag, Munich 1966, pages 96–102.

It is advantageous although not absolutely essential, to use surface-active additives, such as emulsifiers and foam stabilizers, of the type commonly used in the production of foamed polyurethanes, in the process according to the invention. Silicone-containing stabilizers are particularly desirable in cases where the reactive mixture is prefoamed by "whipping in" air and "whip-foaming" before or during the chemical reaction. One example of a silicone stabilizer of this kind suitable for mechanically prefoamed compounds in Union Carbide's Silicon Surfactant L 5612 (see Example 1 of DOS 2 210 934 corresponding to U.S. Ser. No. 122 164).

Polyols containing fillers may also be used for the process according to the invention. Examples of suitable fillers include, naturally occurring minerals such as chalk, kaolin or baryta in finely divided form, aluminum oxide hydrates, mixtures thereof and mixtures with other fillers and/or flameproofing additives.

The reaction components may be generally reacted in known manner by the one-stage process, by the prepolymer process or even by the semi-prepolymer process, advantageously using machinery of the kind described, for example, in Kunststoff-Handbuch, Vol. 7, Vieweg-Hochtlen, Carl-Hanser-Verlag, Munich 1966 on pages 121 to 205. The reactive mixtures which are prepared in separate mixers for the first coat and for the main coat may be successively applied in known manner to the textile floor covering to be coated either by spray-coating or by spread-coating (doctor-coating). In order to obtain a coating with a particularly smooth surface, it is generally preferable to directly coat only the first coat onto the substrate in quantities of from 50 to 500 g/m² and preferably in quantities of from 150 to 250 g/m², while the liquid, foamable or prefoamed mixture of the main coat is applied to a substrate provided with parting release means and this layer combined in as fresh a condition as possible with the precoated floor covering on the "wet-in-wet" principle (cf. drawing). The NCO:OH ratio in the reaction mixture for the main coat must be considerably lower than the NCO:OH ratio in the reaction mixture for the first coat, because, with too large an excess of NCO in the main coat, the coating as a whole would be too hard, would lack flexibility and hence would be susceptible to cracking. At least one of the two reactive layers should not be permitted to react to completion before it is combined with the other layer, since the bond between the two layers would otherwise lose strength. The wet-in-wet combined reactive layers are reacted, generally by heating, and on completion of the reaction the main coat is optionally separated from the parting substrate.

The hardening times of the reaction mixtures for the first coat and main coat may be varied by the type and quantity of catalyst used and by the heating temperature. The heating temperature is generally 100° C and the quantity of catalyst selected in such a way that the main coat takes from 1 to 5 minutes to harden. Atmospheric moisture is required to completely harden the first coat at room temperature because of the large excess of NCO, which naturally gives rise to a longer reaction time. However, this does not generally affect the mold-release time of the coated floor covering.

Instead of using release substrates, it is also possible to use so-called "second backings". Second backings of this kind remain joined to the finished carpet on completion of the reaction and thus increase its strength. In practice, inexpensive woven fabrics or non-wovens of natural or synthetic fibers are used as second backings.

The process according to the invention for coating floor coverings is particularly suitable for finishing tufted, woven and knitted floor coverings, and felted textile floor coverings, although it is by no means limited to floor coverings of this kind. Thus, the process of the invention may also be used for coating mats of vegetable starting materials and other sheet-form materials.

The figures quoted in the examples represent parts by weight and percent by weight unless otherwise stated.

EXAMPLE 1

An activated polyol mixture was prepared by mixing the following components:
90 parts of a trifunctional polypropylene glycol ether started on trimethylol propane with terminal hydroxy ethyl groups (OH-number 32; 85 % of propylene oxide units and 15 % of ethylene oxide units) 10 parts of pure commercial-grade dipropylene glycol (OH-number 750)
2 parts of pure commercial-grade oleic acid
0.5 parts of 1,5-diazabicyclo-(4,3,o)-non-5-ene
0.3 parts of water
Taking its acid number and water content into account, this polyol mixture has a calculated OH-number of 123. 100 parts of dry, powdered chalk were stirred into 100 parts of this polyol mixture, resulting in the formation of "compound A" having an OH-number of 61.5.

1A. Conventional Process (comparison test)

16.9 parts (115% of the equivalent quantity) of a crude 4,4'-diisocyanato diphenyl methane (NCO-content 31.5%; viscosity at 25° C, 80 cP) were added to 100 parts of compound A. This reactive mixture was coated in a quantity of 1200 g/m² onto a plate pretreated with a release agent ("parting substrate"). The release agent was the bis-stearylamide of ethylene diamine, dissolved in a mixture of petrol ether and perchloro ethylene. The back of a 1 square meter tufted carpet ("loop fabric") was quickly introduced into the fresh mixture, after which the material was hardened for 5 minutes in a heating cabinet at 100° C. After it had been lifted off the parting substrate, the carpet was found to be coated with a uniform foam having a gross density of 0.37 g/cc. The properties were tested after storage for 24 hours at room temperature (Table 1/column 1A).

1B. Process according to the invention 150 g of "compound A" were mixed with 51 g (230% of the equivalent quantity) of the crude 4,4'-diisocyanato diphenyl methane from 1A, and the resulting mixture uniformly roll-coated onto a 1 square meter of the back of a tufted carpet. The carpet thus pretreated was introduced "wet-in-wet" into a fresh coating mixture corresponding to 1A, except that on this occasion only 1000 g/m² were used in order to qualize the weight per unit area of the first coat. The material was hardened for 5 minutes at 110° C. The properties were tested, after storage for 24 hours at room temperature. The test results are set out in Table 1, column 1B.

1C. Comparison test

A part (200 g/m²) of the reactive mixture from Example 1A was applied to the carpet. The carpet was then introduced wet-in-wet into the remainder (main coat about 1000 g/m²) of the coating mixture. After hardening for 5 minutes at 110° C, the material was allowed to stand at room temperature for 24 hours. The material was then tested with the results set out in Table 1, column 1C.

1D. Process according to the invention

The procedure was as in 1B using the same amounts of each layer, except that the first coat was first "prereacted" on the carpet for 1 hour at room temperature, after which the first coat was much more viscous and very tacky (filament-pulling). After the first coat had been joined to the main coat, the material was left to harden for 5 minutes at 110° C and tested after 24 hours. The test results are set out in Table 1, column 1D.

1E. Process according to the invention

The procedure was as in 1D except that pre-reaction was conducted with brief heating (50 seconds at 110° C) from a heat source. The test results are set out in Table 1, column 1E.

1F. Process according to the invention 300 g/m² of "first coat" of 100 parts of compound A and 26.5 parts (approximately 180% of the equivalent quantity) of the crude 4,4-diphenyl methane diisocyanate from 1A, were applied to the back of the tufted carpet. The carpet thus pretreated was introduced wetin-wet into the mixture for the main coat (900 g/m²) and hardened by exposure to heat. The test results are set out in Table 1, column 1F.

1G. Process according to the invention 200 g of a reactive mixture of 100 parts of compound A and 34.0 parts (200% of the equivalent quantity) of crude diisocyanato diphenyl methane, were applied to a 1 square meter of the tufted, untreated carpet, followed by storage for several hours at 100° C in a heating cabinet. After the first-coat mixture had completely hardened, 1000 g/m² of the main coat (as in 1A) were applied, followed by tempering for 5 minutes at 110° C. Nap fixing and filament anchorage were not as good as in the wet-in-wet method. Additionally, the bond between the first coat and main coat was not entirely optimal in places, although there was still a distinct improvement compared with the conventional process.

10 parts of pure commercial-grade dipropylene glycol
1.7 parts of nickel acetonyl acetonate
0.05 parts of tetramethyl butylene diamine
0.4 parts of water
150 parts of chalk powder.

The compound has a calculated OH-number of 78.5. Accordingly, 100 parts by weight of compound B are theoretically equivalent to a quantity of 18.7 parts by weight of crude 4,4'-diisocyanato diphenyl methane (31.5% by weight NCO, viscosity at 25° C = 80 cP).

2A. Process according to the invention

A mixture of 100 parts of compound B and 37 parts (200 % of the equivalent quantity) of crude 4,4'-diisocyanato diphenyl methane, was applied in a quantity of 400 g/m² to the back of an untreated tufted carpet. Immediately afterwards 1000 g/m² of a mixture of 100 parts of compound B and 20.5 parts (110% of

TABLE 1

|  | 1 A | 1 B | 1 C | 1 D | 1 E | 1 F | 1 G |
|---|---|---|---|---|---|---|---|
| Nap strength in kp (average from 10 measurements) | 2.7 | 7.5 | 3.8 | 7.6 | 7.4 | 7.7 | 5.8 |
| filament anchorage | adequate | very good | adequate | very good | very good | very good | good |
| stiffness | inadequate | very good | inadequate | very good | very good | very good | very good |
| roll stand test (DIN draft 54 324) | 10,000 | 25,000 | 12,000 | 25,000 | 25,000 | 28,000 | 27,000 |
| gross density g/cc | 0.37 | 0.38 | 0.38 | 0.38 | 0.38 | 0.38 | 0.37 |

Discussion of the test results a. Nap strength, which is measured in a tensile tester of the type normally used for testing in accordance with DIN 53 504, is defined as the force required to rip out a nap from the backing fabric moving at a speed of 150 mm/minute. Nap strength is increased several times by the pretreatment according to the instant invention and reaches values in excess of 5 kp.

b. Filament anchorage was assessed optically from exposed and cut naps and was evaluated subjectively from the signs of wear of the textile by the "roll stand test".

c. Stiffness: a 10 cm wide strip of carpet was arranged horizontally between grips in such a way that a 10 × 10 cm piece projected freely. The stiffness S is defined as the quotient of weight per unit area of the sample G (p/m²) and the dip or sag $f$ (mm): $S=G/f$. Values above 125 were regarded as very good, values between 100 and 110 as satisfactory and values below 70 as inadequate.

d. The roll stand test was carried out in accordance with DIN draft 54 324. Roll stand-compatible carpets should be able to withstand 25,000 revolutions without suffering any appreciable damage. Although the untreated tufted carpet used was not designed for heavy stressing and, for this reason, was destroyed in every test, a considerable improvement is nevertheless obtained by the pretreatment according to the invention.

EXAMPLE 2

A polyol compound B was prepared by mixing
70 parts of the trifunctional polypropylene-ethylene glycol (OH-number 32) of Example 1
20 parts of trifunctional polypropylene glycol started on trimethylol propane (OH-number 370)

the equivalent quantity) of crude 4,4'-diisocyanato diphenyl methane were applied as the main coat, and the coated carpet heated for 15 minutes to 120° C.

The product had a nap strength of 8.5 kp. In the roll stand test, the coating underwent 24,000 cycles before destruction. Filament anchorage is extremely good. The foam layer has a gross density of 0.34 g/cc.

2B. Comparison test

The untreated carpet was directly coated with 1500 g/m² of a mixture of 100 parts of compound B and 20.5 parts of 4,4'-diphenyl methane diisocyanate, followed by hardening for 15 minutes at 120° C. The roll stand test had to be terminated after 9000 revolutions as a result of destruction of the material. Filament anchorage was inadequate, nap strength only amounted to 2.67 kp and stiffness S to 85–90. The foam layer has a gross density of 0.35 g/cc.

2C. Process according to the invention 70 parts of chalk were additionally stirred into 250 parts of compound B. The "first-coat compound" thus obtained has a calculated OH-number of approximately 61.5, disregarding the moisture content of the additional quantity of chalk. Accordingly, 44 parts (approximately 300% of the equivalent quantity) of crude 4,4'-diisocyanato diphenyl methane were added to 100 parts of the first-coat compound. 1000 g/m² of the main coat were applied to 600 g/m² of the first coat and hardened by heating. The coated carpet thus produced has a high degree of stiffness (S = 130), withstands more than 25,000 revolutions in the roll stand test and shows extremely good fiber anchorage.

EXAMPLE 3

Polyol compound C consists of a mixture of 70 parts of a linear polypropylene glycol ether modified with ethylene oxide (OH-number 28), prepared by polyaddition of 80% of propylene oxide and 20% of ethylene oxide, started on propylene glycol 8 parts of pure commercial-grade dipropylene glycol (OH-number 750)

30 parts of a trifunctional polypropylene glycol ether (OH-number 345), started on glycerol 2 parts of ricinoleic acid (calculated OH-number 376)

0.4 parts of 2,3-dimethyl-3,4,5,6-tetrahydropyrimidine 150 parts of chalk powder.

Compound C has an OH-number of 73, taking into account the moisture content of the filler (approximately 0.1%).

3A. Comparison test (without precoating)

Coating is carried out by means of an installation of the type shown in FIG. 1 (coating rate = 3 m/minute, working width 2 m, output 6 m$^2$/minute). A high-shear mixer was fed by a metering unit with 6,000 g per minute of compound C and 120 g per minute of a crude polyphenyl polymethylene polyisocyanate (crude MDI) having an NCO content of 30.6, 150 g per minute of a silicone stabilizer (silicone surfactant L 5612 by union carbide) and compressed air (under about 6 atms) being introduced at the same time through another, small metering pump (not shown in the drawing). The mixer hose discharged a mechanically prefoamed reactive mass which was uniformly distributed over the parting substrate (fabric coated with silicone rubber) by means of a doctor coater and subsequently combined with the untreated, tufted carpet. The mixer was hardened in a heating oven (residence time: 3 minutes at 100° C).

The coating has a gross density of 0.30 g/cc. Nap strength amounts to 1.7 – 2.2 kp. The roll stand test was terminated after 6000 revolutions because some of the tufting loops had been pulled out of the backing material and some of the filaments were torn out.

3B. Process according to the invention

While as in 3A, 5 kg per minute of the mechanically prefoamed main-coat mixture were being prepared and coated onto the parting substrate, a pre-coat mixture of 1000 g/minute of polyol compound C and 400 g/minute of polyisocyanate was prepared in a small adjacent metering/mixing unit without prefoaming by stirring in air and without the addition of silicon. The pre-coat mixture was roll-coated onto the back of the untreated tufted carpet in a quantity of approximately 230 g/m$^2$. Thereafter the first coat and main coat were combined and hardened in the heating zone.

The carpet so produced withstood more than 35,000 revolutions in the roll stand test. Nap strength amounts to 7.1 kp and stiffness S to 120. Filament anchorage is excellent.

What is claimed is:

1. A process for coating the back of a textile floor covering with a polyurethane foam comprising:
   a. applying a reacting foamable or reacting prefoamed mixture of a polyol and a polyisocyanate directly to the back of said textile floor covering, the NCO to OH equivalent ratio in said reacting foamable or reacting prefoamed mixture being from 1.5:1 to 3.5:1;
   b. applying to said reacting foamable or reacting prefoamed mixture before said reacting foamable or reacting prefoamed mixture has fully reacted a second reacting foamable or reacting prefoamed mixture of a polyol and a polyisocyanate, the NCO to OH equivalent ratio in said second mixture being from 0.95:1 to 1.25:1; and
   c. allowing the composite material of step (b) to harden, thereby forming said foam coating.

2. The process of claim 1, wherein said second mixture is prefoamed prior to application to the first mixture.

3. The process of claim 1, wherein the same materials are used in both layers.

4. The process of claim 1, wherein step (c) comprises hardening in a heated zone.

* * * * *